(12) United States Patent
Le Quere

(10) Patent No.: US 10,374,333 B2
(45) Date of Patent: Aug. 6, 2019

(54) COUPLING DEVICE PROVIDING ELECTRICAL CONTINUITY BETWEEN TUBES

(71) Applicant: PARKER HANNIFIN MANUFACTURING FRANCE SAS, Annemasse (FR)

(72) Inventor: Philippe Le Quere, Betton (FR)

(73) Assignee: PARKER HANNIFIN MANUFACTURING FRANCE SAS, Annemasse (FR)

( * ) Notice: Subject to any disclaimer, the term of this patent is extended or adjusted under 35 U.S.C. 154(b) by 0 days.

(21) Appl. No.: 15/302,609

(22) PCT Filed: Apr. 14, 2015

(86) PCT No.: PCT/EP2015/058064
§ 371 (c)(1),
(2) Date: Oct. 7, 2016

(87) PCT Pub. No.: WO2015/158708
PCT Pub. Date: Oct. 22, 2015

(65) Prior Publication Data
US 2017/0040717 A1    Feb. 9, 2017

(30) Foreign Application Priority Data
Apr. 14, 2014  (FR) ...................... 14 53331

(51) Int. Cl.
*H01R 4/60*  (2006.01)
*F16L 25/01*  (2006.01)
*F16L 37/091* (2006.01)

(52) U.S. Cl.
CPC ............ *H01R 4/60* (2013.01); *F16L 25/01* (2013.01); *F16L 37/0915* (2016.05)

(58) Field of Classification Search
CPC ............................ F16L 37/0915; H01R 4/60
(Continued)

(56) References Cited

U.S. PATENT DOCUMENTS 3,891,290 A * 6/1975 Marshall ............. F16L 19/0218
174/78
3,989,342 A * 11/1976 Fischer ................... H01F 27/04
439/184
(Continued)

FOREIGN PATENT DOCUMENTS

DE   41 24 968 A1   1/1993
EP   1020677 A1 *   7/2000   .......... F16L 37/0915
(Continued)

OTHER PUBLICATIONS

International Search Report and Written Opinion for corresponding Patent Application No. PCT/EP2015/058064 dated Jul. 3, 2015.

*Primary Examiner* — Abdullah A Riyami
*Assistant Examiner* — Nader J Alhawamdeh
(74) *Attorney, Agent, or Firm* — Renner, Otto, Boisselle & Sklar, LLP

(57) ABSTRACT

A connection device for connecting together electrically-conductive tubes, the device comprising a body (1) defining a channel (2) having two end segments, each arranged to receive an end of one of the tubes. Each end segment (3) is provided with an annular recess (5) provided with a flank (8) facing towards the inlet of said end segment (3). The device comprises at least one elastically deformable electrical conductor element (9) having ends bearing against said flanks (8) and an intermediate portion (13) extending into the channel (2) in order to provide electrical continuity between the two tube ends.

13 Claims, 3 Drawing Sheets

(58) Field of Classification Search
USPC .......................................................... 439/192
See application file for complete search history.

(56) References Cited

U.S. PATENT DOCUMENTS

| | | | | |
|---|---|---|---|---|
| 4,346,428 | A * | 8/1982 | Gale | F16L 25/01 |
| | | | | 174/47 |
| 4,491,685 | A * | 1/1985 | Drew | H01R 9/05 |
| | | | | 174/75 C |
| 4,659,870 | A | 4/1987 | Jones | |
| 5,487,572 | A * | 1/1996 | Combot-Courrau | ........................ |
| | | | | F16L 37/0915 |
| | | | | 285/308 |
| 7,862,089 | B2 * | 1/2011 | Crompton | F16L 19/08 |
| | | | | 285/340 |
| 9,068,680 | B1 * | 6/2015 | Crompton | F16L 37/091 |
| 9,671,049 | B1 * | 6/2017 | Crompton | F16L 19/065 |
| 9,765,912 | B2 * | 9/2017 | Spears | F16L 27/12 |
| 9,810,359 | B2 * | 11/2017 | Spears | F16L 37/091 |
| 2008/0048442 | A1 * | 2/2008 | Kerin | F16L 25/01 |
| | | | | 285/305 |
| 2009/0096209 | A1 | 4/2009 | Zilch | |
| 2010/0025079 | A1 | 2/2010 | Flynn | |
| 2010/0178011 | A1 * | 7/2010 | Le Quere | G02B 6/4459 |
| | | | | 385/84 |
| 2010/0253064 | A1 * | 10/2010 | Le Quere | F16B 43/006 |
| | | | | 285/3 |
| 2011/0034066 | A1 * | 2/2011 | Jazowski | H02G 3/22 |
| | | | | 439/426 |
| 2011/0318099 | A1 * | 12/2011 | Le Quere | F16C 1/107 |
| | | | | 403/376 |
| 2016/0305803 | A1 * | 10/2016 | Wohlgemuth | G01F 1/58 |
| 2018/0184552 | A1 * | 6/2018 | Omae | H05K 9/0088 |

FOREIGN PATENT DOCUMENTS

| | | |
|---|---|---|
| EP | 1 936 251 A1 | 6/2008 |
| GB | 2 204 189 A | 11/1988 |
| WO | WO 2007057535 A1 * | 5/2007 ............ F16L 33/227 |

* cited by examiner

COUPLING DEVICE PROVIDING ELECTRICAL CONTINUITY BETWEEN TUBES

The present invention relates to fluid transport circuits, and more precisely to a device for connecting tubes together.

A connection device generally comprises a body defining a channel having two end segments, each provided with means for securing therein an end of one of the tubes in leaktight manner. Each end segment is thus provided with an annular recess that receives a sealing element for clamping onto the tube end and that includes an abutment shoulder for opposing the sealing element being pushed further into the body while the tube end is being inserted.

The body is generally made of an electrically insulating material. In certain applications, the tubes are themselves made of metal and it is necessary to provide electrical continuity between the tubes. For this purpose, it is known to fasten the ends of an electrically conductive braid on the ends of the tubes, which braid extends over the connection device. Nevertheless, that requires an additional operation to be performed after the tubes have been connected to the connection device. Furthermore, that operation may be omitted by an operator, and it goes against providing the connection device with quick coupling means.

An object of the invention is to remedy the above-specified problem, at least in part.

To this end, the invention provides a connection device for connecting together electrically-conductive tubes, the device comprising a body defining a channel having two end segments, each arranged to receive an end of one of the tubes. Each end segment is provided with an annular recess provided with a flank facing towards an inlet of said end segment. The connection device includes at least one elastically deformable electrical conductor element having ends bearing against said flanks of the annular recesses and at least one intermediate portion extending into the channel in order to provide electrical continuity between the two tube ends.

The inlet of the end segment is the inlet through which the tube end is to be inserted into said end segment. The conductor element is retained in the body in simple manner by clip fastening (its ends bearing resiliently against the two oppositely-facing flanks of the annular recesses), thereby facilitating assembly.

Preferably, the intermediate portion is curved and projects into the channel in order to bear against the outside surfaces of the tube ends.

The electrical conductor element thus provides electrical continuity between the tubes by making contact with the outside surfaces of the tubes, which contact can be maintained even in the event of the tubes moving backwards, e.g. under the effect of the circuit that includes the connection device being put under pressure.

Other characteristics and advantages of the invention appear on reading the following description of particular, non-limiting embodiments of the invention.

Reference is made to the accompanying drawings, in which.

The connection device of the invention is for enabling two tubes to be put into fluid flow connection with each other. The tubes have an outside diameter D and they are made of electrically conductive material, such as a metal, e.g. stainless steel. The metal is bare at least on the outside surface at the end of each tube that is to be engaged in the connection device.

Figure 1:
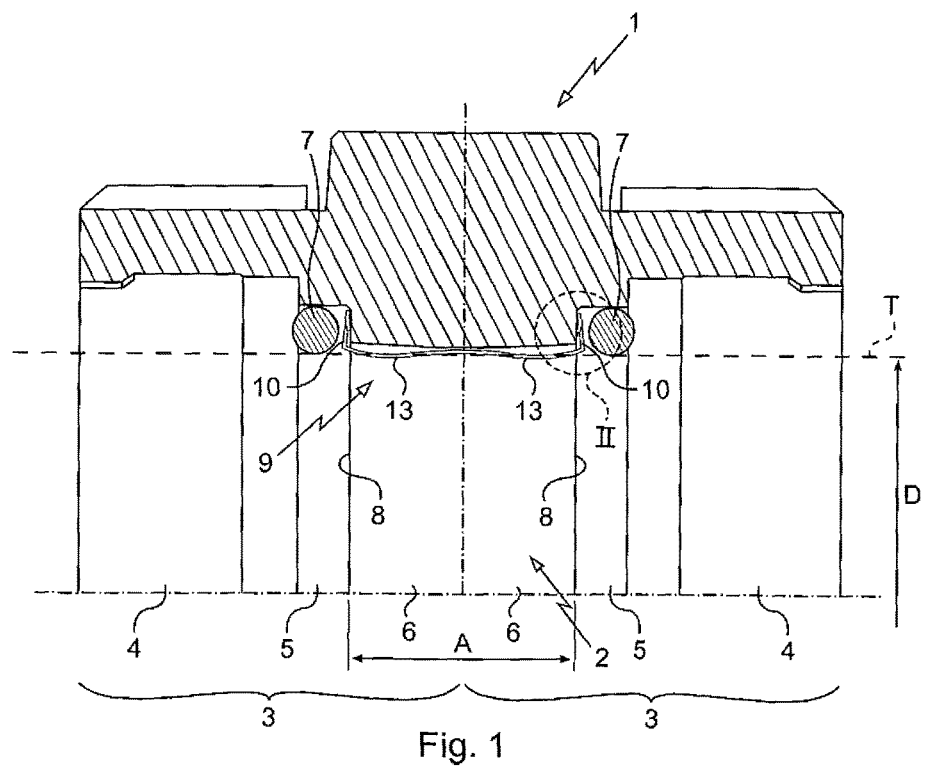
FIG. 1 is a longitudinal section view of a connection device in a first embodiment of the invention.
Figure 2:
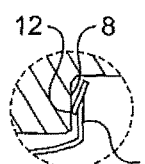
FIG. 2 is an enlarged view of zone II in FIG. 1, showing one of the ends of the conductor elements of the device.
Figure 3:
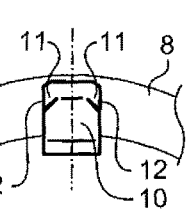
FIG. 3 is a fragmentary side view of this end.

With reference to FIGS. 1 to 3, the connection device in the first embodiment of the invention comprises a body given overall reference 1, defining a channel given overall reference 2 having two end segments 3 that are arranged identically so that each of them receives an end of one of the tubes T (drawn in dashed lines in FIG. 1).

Each end segment 3 is provided with an inlet recess 4, an intermediate recess 5, and a terminal housing 6. All of the recesses and the housings are annular in shape. The inlet recess 4 is arranged to receive a bushing (not shown) for engaging an external portion in relief of the tube. The intermediate recess 5 receives a sealing element 7 arranged to clamp onto the end of the tube and is provided with a flank facing towards the inlet of said end segment 3 so as to form an abutment surface 8 to oppose the sealing element 7 being pushed farther into the body 1. The terminal housing 6 has a diameter that is slightly greater than the diameter D and it is thus arranged to receive the terminal portion of the tube end. The terminal housings 6 are in communication with each other and they form the central segment of the channel 2. The abutment surfaces 8 are spaced apart from each other by a distance A.

The tube ends are held in the connection device by means of sleeves that grip the engagement bushings and that are screwed into the ends of the body 1. These tube retaining means are themselves known, e.g. from Document EP-A-1 522 356, and they are therefore not described in detail herein.

The connection device has at least one electrical conductor element given overall reference 9 that extends in the central segment of the channel 2. In this example, the electrical conductor element 9 is an elastically deformable metal foil, made of stainless steel in this example, and having the shape of a staple.

The electrical conductor element 9 has ends 10 for bearing against the abutment surfaces 8 in such a manner that the electrical conductor element 9 pinches the two abutment surfaces 8 as a result of its elasticity. The ends 10 face each other and they are spaced apart from each other by a distance that is shorter than the distance A. Each end 10 of the electrical conductor element 9 has two oblique cuts 11 having first ends opening out into respective opposite longitudinal edges of the end 10, and second ends that are linked together by a fold line along which the end 10 is folded so as to form two sharp teeth 12 projecting from the electrical conductor element 9. The ends 10 thus present teeth 12 that are formed by cutting and by plastic deformation and that are arranged to bite into the abutment surface 8 like barbs, thereby opposing removal of the electrical conductor element 9.

The electrical conductor element 9 has two curved intermediate portions 13 extending in the terminal housing 6 and projecting radially towards the central axis of the channel 2 so that each of them bears against the outside surface of the pipe end received in said terminal housing 6. The curved intermediate portions 13 thus define a through section of diameter that is less than the diameter D.

When the ends of the tubes T are engaged in the connection device as far as the terminal housings 6, the curved intermediate portions 13 rub against the outside surfaces of the tube ends and they are pressed resiliently against said outside surfaces. The conductor element 9 thus provides elliptical continuity between the two tube ends.

Figure 4:
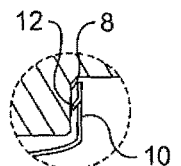
FIGS. 4 and 5 are views analogous to FIGS. 2 and 3 showing a first variant embodiment of the ends of the conductor element.
Figure 5:
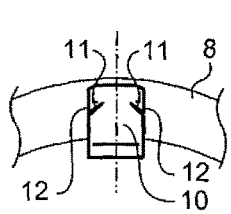

In the first variant of the conductor element 9 shown in FIGS. 4 and 5, each end 10 of the electrical conductor element 9 has two oblique cuts 11, each of which has a first end opening out in a respective one of the longitudinal edges of the end 10 and a second end linked to said edge by a fold line along which the cut portion is folded to form a pointed tooth 12 projecting from the electrical conductor element 9. The end 10 thus has two teeth 12 arranged as barbs to engage the abutment surface 8.

Figure 6:
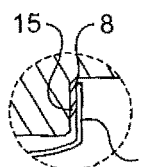
FIGS. 6 and 7 are views analogous to FIGS. 2 and 3 showing a second variant embodiment of the ends of the conductor element.
Figure 7:
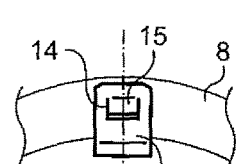

In the second variant of FIGS. 6 and 7, each end 10 of the electrical conductor element 9 has a central cut 14 defining three sides of a tooth 15 of rectangular shape that is folded to project from the end 10 of the electrical conductor element 9. The tooth 15 is arranged to bite into the abutment surface 8 like a barb.

Figure 8:
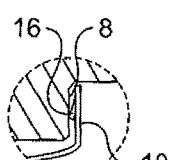
FIGS. 8 and 9 are views analogous to FIGS. 2 and 3 showing a third variant embodiment of the ends of the conductor element.
Figure 9:
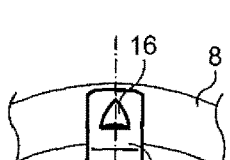

In the third variant of FIGS. 8 and 9, each end 10 of the electrical conductor element 9 is provided with a plunged boss forming a tooth 16 of triangular shape projecting from the end 10 of the electrical conductor element 9. The tooth 16 is arranged to bite into the abutment surface 8.

Figure 10:
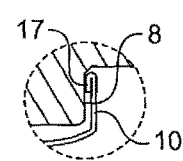
FIGS. 10 and 11 are views analogous to FIGS. 2 and 3 showing a fourth variant embodiment of the ends of the conductor element.
Figure 11:
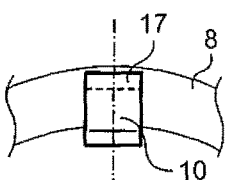

In the fourth variant of FIGS. 10 and 11, each end 10 of the electrical conductor element 9 has a terminal portion that is folded over by plastic deformation and that forms a tooth 17 of rectangular shape that projects from the end 10 of the electrical conductor element 9. The teeth 17 face each other and each has an edge suitable for penetrating into the abutment surface 8.

Figure 12:
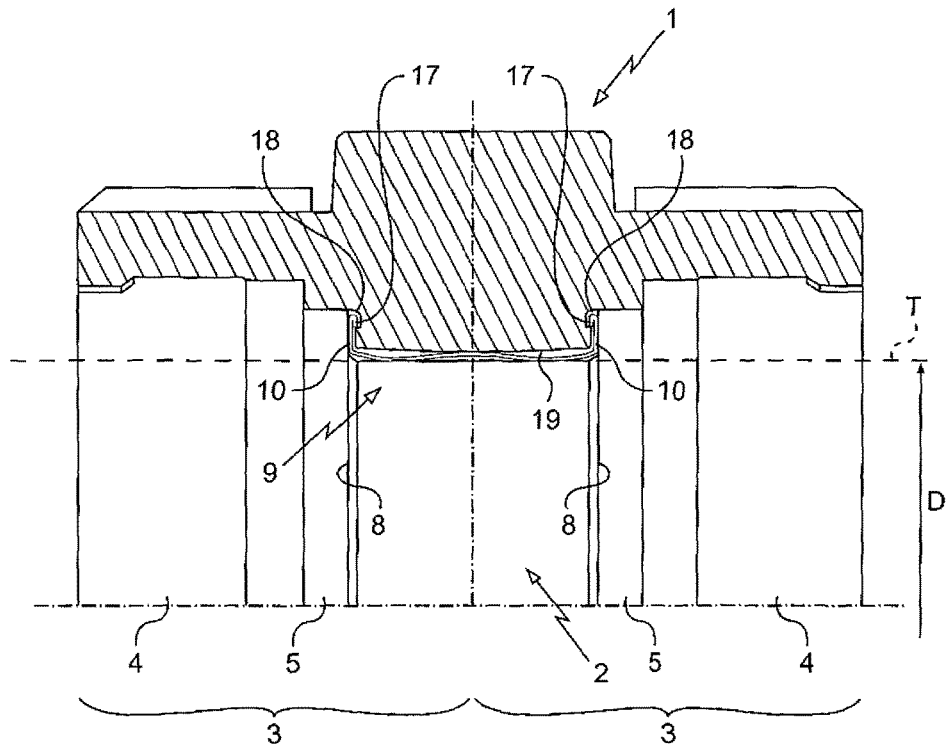
FIG. 12 is a view analogous to FIG. 1 of a connection device in a first variant of the connection device of the first embodiment.

FIG. 12 shows a connection device in a first variant of the first embodiment. In this variant, the conductor element 9 complies with the fourth variant of FIGS. 10 and 11, and a plane groove 18 is formed axially in at least one of the abutment surfaces 8 in order to form a setback receiving the tooth 17 (a groove 18 is formed in each abutment surface in this example). This ensures that the conductor element 9 is held in position better.

In addition, a slot 19 is formed axially in the terminal housings 6 between the two abutment surfaces 8 that receive the conductor element 9. Only the curved portions 13 project radially from the slot 19.

Figure 13:
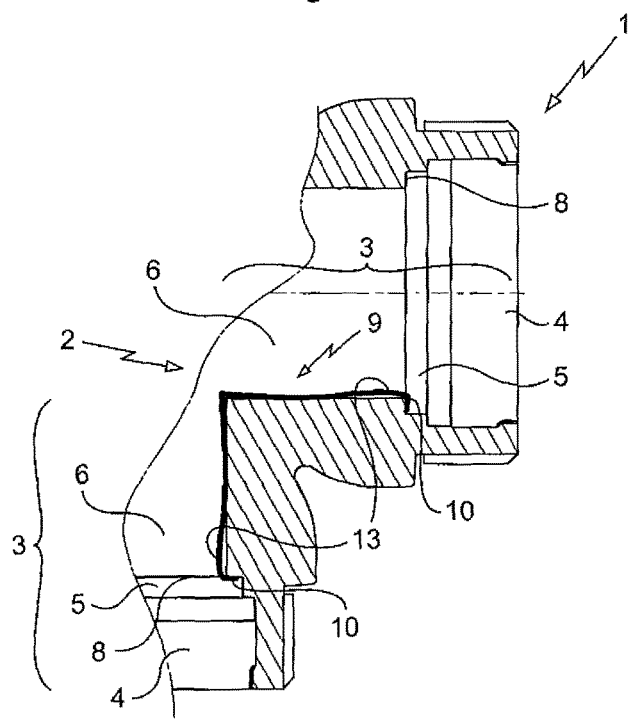
FIG. 13 is a view analogous to FIG. 1 showing a connection device in a second variant of the connection device in the first embodiment.

FIG. 13 shows a connection device in a second variant of the first embodiment. In this variant, the body 1, and thus the channel 2, form a 90° bend. The conductor element 9 is itself bent so that the two curved intermediate portions are at 90° to each other.

Figure 14:
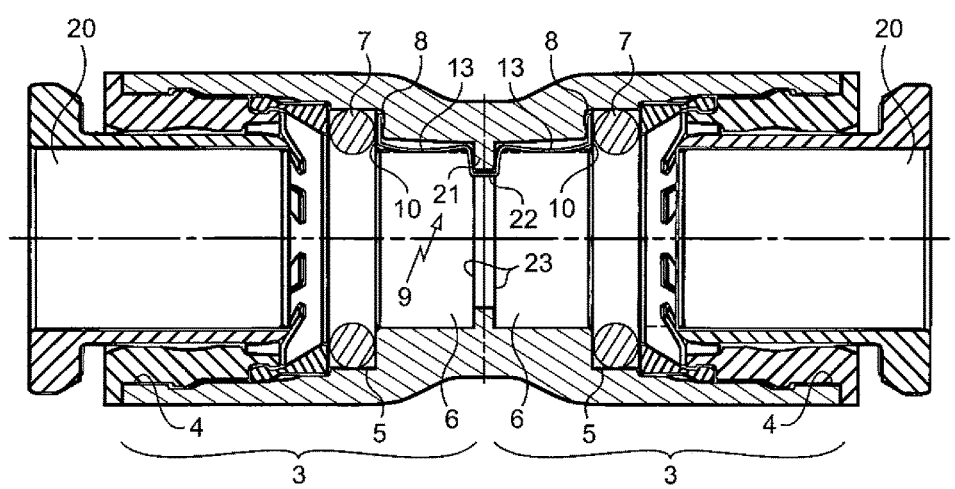
FIG. 14 is a view analogous to FIG. 1 showing a connection device in a second embodiment.

In the second embodiment shown in FIG. 14, the inlet segment 4 of the channel 2 formed in the body 1 receives conventional quick coupling means 20. In this example, the coupling means are of the type comprising a deformable engagement washer and a disconnection pusher.

The body 1 has a central collar 21 that projects into the channel 2 and that lies between the two terminal segments 6. The central collar 21 is connected to the terminal segments via two abutment shoulders 23, each opposing one of the tube ends being pushed in further. The electrical conductor element 9 includes a bridge-forming segment 22 between its curved portions 13 for passing over the central collar 21.

Naturally, the invention is not limited to the embodiment described, but covers any variant coming within the ambit of the invention as defined by the claims.

In particular, the means for retaining the tubes may be different from those described and may in particular include for example: a clamp, a gland, a nut, etc.

The electrical conductor element 9 may be of a structure that is different from that described and for example it may be formed by a wire. The electrical conductor element 9 may be made of any electrically conductive material, for example it may be made of copper.

The recesses in which the ends of the electrical conductor element 9 are engaged need not receive respective sealing elements.

The conductor element could have only one curved intermediate portion. The body of the connection device may be of a shape different from those described, for example it may be T-shaped.

The invention claimed is:

1. A connection device for connecting together electrically-conductive tubes, the device comprising
    a body defining a channel having two integral end segments, each arranged to receive an end of one of the tubes, each end segment being provided with an annular recess provided with a flank forming an abutment surface facing axially towards an inlet of said end segment, and
    at least one elastically deformable electrical conductor element having ends respectively bearing resiliently axially against the abutment surfaces and at least one intermediate portion extending into the channel for contacting an outside diameter surface of both tube ends in order to provide electrical continuity between the two tube ends.

2. A device according to claim 1, wherein the intermediate portion is curved and projects into the channel in order to bear against the outside surfaces of the tube ends.

3. A device according to claim 1, wherein the conductor element has two curved portions, each arranged to bear against the outside surface of one of the pipe ends.

4. A device according to claim 3, wherein the body has a central collar defining two abutment shoulders, each for opposing one of the tube ends being pushed in further, and the electrical conductor element further includes a bridge-shaped segment between the curved portions passing over the collar.

5. A device according to claim 1, wherein a slot is arranged axially in a wall of the body defining the channel between the two abutment surfaces, the conductor element extending in the slot so that only the curved portion projects radially from the slot.

6. A device according to claim 1, wherein the conductor element is a foil having the shape of a staple.

7. A device according to claim 6, wherein at least one of the ends of the foil is arranged to bite into the abutment surface.

8. A connection device for connecting together electrically-conductive tubes, the device comprising
   a body defining a channel having two integral end segments, each arranged to receive an end of one of the tubes, each end segment being provided with an annular recess provided with a flank facing axially towards an inlet of said end segment, and
   at least one elastically deformable electrical conductor element having ends bearing resiliently axially against said flanks of the annular recesses and at least one intermediate portion extending into the channel for contacting an outside diameter surface of both tube ends in order to provide electrical continuity between the two tube ends;
   wherein the conductor element is a foil having the shape of a staple;
   wherein at least one of the ends of the foil is arranged to bite into the abutment surface; and
   wherein said end of the foil has at least one tooth formed by plastic deformation.

9. A device according to claim 8, wherein said at least one tooth is also formed by cutting.

10. A device according to claim 8, wherein said tooth is formed as a plunged boss.

11. A device according to claim 1, wherein the conductor element is a wire.

12. A device according to claim 1, wherein at least one of the flanks includes a setback in which the corresponding end of the conductor element is engaged.

13. A device according to claim 1, wherein each annular recess receives a sealing element for clamping onto the tube end and the the abutment surfaces opposes respective sealing elements from being pushed further into the body.

* * * * *